United States Patent [19]

McKee et al.

[11] Patent Number: 4,728,920

[45] Date of Patent: Mar. 1, 1988

[54] PRESSURE TRANSDUCER

[75] Inventors: William D. McKee; John L. Evans, both of Huntsville; Joseph T. Betterton, Arab; Alfred H. Glover, Decatur; Thomas S. McKee, Madison, all of Ala.

[73] Assignee: Chrysler Motors Corporation, Highland Park, Mich.

[21] Appl. No.: 55,267

[22] Filed: May 29, 1987

[51] Int. Cl.⁴ .............................................. H01L 10/10
[52] U.S. Cl. ........................................ 338/39; 73/746; 338/47
[58] Field of Search ................... 338/36, 39, 13, 47; 73/744, 745, 746

[56] References Cited

U.S. PATENT DOCUMENTS 2,669,876  2/1954  Lentz .................................. 73/746 X
2,790,043  4/1957  Clason ................................ 338/39 X
3,018,457  1/1962  Clason ................................ 338/39

Primary Examiner—C. L. Albritton
Attorney, Agent, or Firm—Kenneth H. MacLean, Jr.

[57] ABSTRACT

A fluid pressure transducer having a hollow enclosure with an elongated tubular guide supported therein around which a tubular piston moves in response to fluid pressure forces acting on one piston end. A spirally-wound wire resistance coil on the guide is contacted by one end of a conductor carried by the movable piston to effectively charge resistance through the conductor and parts of the coil. The conductor is connected to one end of a metal spring which opposes piston movement due to pressure forces. An opposite end of the metal spring is connected to a terminal to transmit the resistance changes.

3 Claims, 2 Drawing Figures

U.S. Patent   Mar. 1, 1988   4,728,920
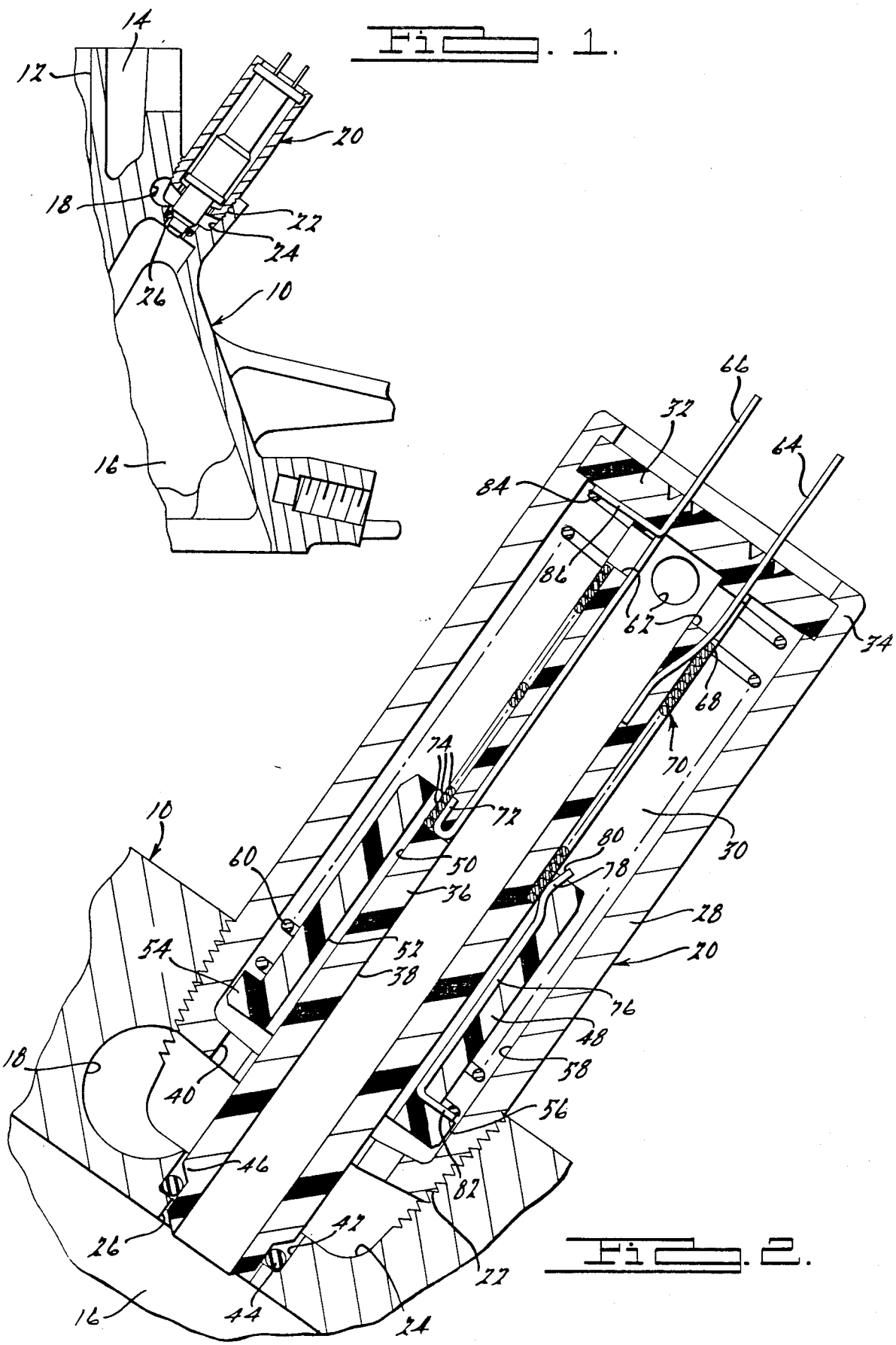

PRESSURE TRANSDUCER

BACKGROUND OF THE INVENTION

The subject application concerns an improved device for measuring fluid pressure, such as the oil pressure in a vehicle engine. Typically, prior devices utilize a flexible diaphragm or the like movable in response to changes in fluid pressure. They have the disadvantage of being subject to wear and resultant fluid leakage as the diaphragm flexes. Also, general deterioration over time is a concern. In contrast, a constant flow of fluid passes through the subject device, at least in small quantities. Accordingly, there is no need for a flexible diaphragm to separate portions of the device. A prior attempt to utilize a device of this type is U.S. Pat. No. 3,018,457. This patent shows a device with a piston supported within a cylinder and with one of its ends subjected to fluid pressure. A spring acting on the other piston end resists movement urged by fluid pressure. Movement of the piston is indicated by corresponding movement of an attached rod which projects away from the piston and carries a metal contact which, in turn, rubs along a remotely located resistance coil. It is stated that this device permits a small quantity of fluid to leak around the piston. Accordingly, the subject pressure measuring device or transducer is an improvement over this patented device.

SUMMARY OF THE INVENTION

The subject pressure measuring device or transducer does not include a diaphragm or the like, but utilizes a movable member supported about a guide in a manner permitting fluid to leak therebetween. Thus, the necessity for a flexible diaphragm or the like to separate portions of the transducer are eliminated. In addition, the subject transducer has a tubular guide member with a central passage to form a flow path for fluid entering and passing through the transducer. The guide member provides a cylindrical surface about which a wire wound resistance coil is supported. Fluid pressure changes exert forces on and cause movement of a tubular piston member. Opposing forces are created by a yieldable spring means. The tubular piston member carries an electrical contact with an end portion which is slidable in the axial direction of the guide and along the resistance coil.

The quantity of fluid which can leak between the tubular piston member and the guide is not sufficient to appreciably affect the pressure of fluid, namely lubricating oil, in an engine. An advantage of the subject construction is its simplicity partially due to the concentric arrangement of parts. Another feature concerns the use of the contact attached to the tubular piston member which is electrically connected to an end of a conductive spring means. The other end of the spring means is connected to a terminal so that the spring means serves as a spring and as a pathway for the electrical signal.

The primary advantage of this improved transducer lies in its simple construction and compact arrangement of parts, including the aforementioned multi-purpose use of the spring and the tubular piston member movable along the guide member. Other advantageous features and advantages of the subject pressure transducer will be more readily apparent, reference being had to the accompanying drawings in which a preferred embodiment is illustrated.

IN THE DRAWINGS

FIG. 1 is a partial sectioned view of an engine block showing the subject pressure transducer mounted therein; and FIG. 2 is an enlarged sectioned view of the pressure transducer and part of the engine block shown in FIG. 1.

DETAILED DESCRIPTION OF AN EMBODIMENT

In FIG. 1, part of a vehicle engine block 10 is illustrated. Specifically, the sectioned view of the engine block 10 shows one cylinder bore 12 for reciprocally supporting a piston (not visible). Encircling the cylinder bore 12 is a water jacket or passage 14. A lower portion of the engine block 10 defines an interior space 16 for enclosing the crankshaft (not visible) and for storage of engine lubricating oil below the crankshaft. In FIG. 1, an oil passage 18 is shown for transmitting pressurized lubricating oil from an engine oil pump (not visible). The subject device or transducer 20 is illustrated and is attached at threaded end 22 to the engine block 10. It extends into a space or cavity 24 which is fluidly interconnected with the passage 18. An aperture or passage 26 connects cavity 24 to the engine block's space 16. This permits fluid to be discharged from the transducer to the oil storage below the crankshaft.

As best shown in FIG. 2, the transducer 20 is basically housed or enclosed by enclosure member 28 consisting of a generally cylindrical and thin-walled member. The enclosure 28 is hollow and defines a space or interior 30. The enclosure 28 has end portion 22 which is threaded for removable attachment to the engine block 10. The opposite end of the enclosure 28 is covered or closed by an end member 32 whose peripheral edge is secured in a groove of the enclosure member 28 and, specifically, is held thereto by a turned-over edge portion 34 thereof. This provides a leakproof connection therebetween.

An elongated tubular guide 36 projects axially through the interior 30 of the enclosure 28. Specifically, the guide member 36 is integrally part of the end member 32 in a preferred embodiment. Both members 32 and 36 are molded of elastomeric material. The tubular guide 36 includes a central passage 38 therethrough for transmitting oil to space 16. The tubular guide portion 36 extends through an aperture 40 in the lower end of the enclosure 28 and then projects through the aperture 26 in the engine block 10. The aperture 26 is a slightly stepped bore with an enlarged diameter portion 42 thus encircling the guide member 36 so that an O-ring type seal 44 is captured therebetween. A shoulder portion 46 formed in the guide member 26 engages the O-ring 44 to axially fix the seal.

An annularly shaped and tubular piston member 48 encircles the guide portion 36 in a manner permitting axial movement thereon. Specifically, the cylindrical exterior surface 50 of member 36 has smaller diameter than the inner diameter of a surface 52 of the piston member 48. Thus, a rather small flow of pressurized fluid flows from passage 18 and aperture 40 to the upper interior portion of enclosure 28.

The tubular piston member 48 has an enlarged diameter end portion 54 with an outer surface 56 which is closely spaced with respect to the inner surface 58 of the enclosure member 28. Thus, fluid leakage therebetween is minimized while still allowing the member 48 to move axially along the guide member 36. A metallic coil type spring 60 extends between the enlarged end portion 54 and the end cover portion 32. The spring 60 functions as a compression type spring which yieldably resists movements of the member 48 upward and to the right in FIG. 2. Fluid pressure increases are communicated through aperture 40 to urge member 48 upward and to the right in FIG. 2 against the yieldable force of the spring 60. The small leakage of pressurized fluid about piston 48 is slight and does not significantly decrease the pressure of fluid in passage 18. However, some fluid passes through device 20 and is returned to space 16. To permit fluid flow to enter passage 38, a plurality of openings 62 are provided in guide member adjacent the upper end portion 32. The fluid then flows through passage 38 and aperture 26 to space 16.

Thus far, it can be understood that increased fluid pressure communicated from passage 18 causes member 48 to move upward and to the right in FIG. 2. Conversely, decreased fluid pressure allows the spring 60 to move member 48 downward and to the left in FIG. 2. In order to measure and utilize the changes in fluid pressure, transducer 20 is provided with a pair of metallic terminals 64 and 66 which are molded with the end cover portion 32 of the transducer. Terminal 64 extends through the end cover portion 32 and across one of the apertures 62 and then through the guide member 36. At least one of the upper end coils 68 of a spirally wound coil 70 are connected to the terminal 64. Likewise, the terminal 66 extends through the end cover member 32 and through a portion of the tubular guide member 36 apart from coil 70. At least one of the end coils 74 of the spirally wound coil 70 are connected to the terminal 66.

The coil 70 provides a fixed electrical resistance through a circuit between terminal 64 and 66. This coil resistance represents a zero pressure indication or at "rest" condition for the transducer.

The tubular piston member 48 carries an L-shaped electrical conductor 76 with a curved end portion 78 which forms a contact surface 80 adapted to engage the outer surfaces of the individual wire portion of coil 70. The lower end 82 of the conductor 76 extends radially outward and engages one end of the metallic coil spring 60. The upper end 84 of the coil spring 60 engages a radially outwardly extending portion 86 of terminal 66. Accordingly, as member 48 moves upward and to the right in FIG. 2, due to increased fluid pressure, the contact 80 is moved along the outer surface of the individual wires of resistance coil 70. As a result, the resistance exhibited across terminals 64 and 66 decreases as the contact 80, in association with the circuit including the electrical conductor 76, and metallic spring 60 axially slide along the coil 70. Conversely, as fluid pressure decreases, the contact 80 moves lower and to the left along coil 70. This results in an increased resistance exhibited across terminals 64, 66.

Although only one embodiment of the subject improved pressure transducer has been discussed in detail and illustrated in the drawings, modifications thereof may be made which fall within the scope of the following detailed claims which describe the invention.

We claim:

1. A pressure transducer for measuring the pressure of an engine lubricating fluid, comprising:
   transducer enclosure means defining an interior space and having an apertured end portion for attachment to the engine in a manner exposing the interior space to pressurized lubricating fluid;
   the enclosure means having an opposite closed end;
   an elongated tubular guide member supported by the closed end and extending through the interior space and through the apertured end portion;
   an axially extending passage formed through the guide member and communicated with the surrounding interior space adjacent the closed and to permit the flow of fluid from the interior space into the passage;
   a tubular piston member supported within the enclosure means and about the guide member in a manner exposing one end to fluid from the engine and permitting axial movements thereof along the guide member in response to forces created by pressurized fluid;
   electrically conductive spring means extending between the closed end of the enclosure means and the tubular piston member normally urging the piston member in opposition to forces caused by the pressurized fluid;
   an electrical contact means carried by the tubular piston member;
   a spirally-wound wire coil about the guide member, the contact means and the wire coil being slidably cooperative as the tubular piston member moves along the guide member to produce a variable resistance in a circuit including portions of the coil, the contact means and the conductive spring.

2. A pressure transducer for measuring the pressure of an engine lubricating fluid, comprising:
   transducer enclosure means defining an interior space and having an apertured end portion for attachment to the engine in a manner exposing the interior space to pressurized lubricating fluid;
   the enclosure means having an opposite closed end;
   an elongated tubular guide member supported adjacent the closed end and extending through the interior space and through the apertured end portion;
   an axially extending passage formed through the guide member and communicated with the surrounding interior space adjacent the closed end to permit the flow of fluid from the interior space into the passage;
   an elongated tubular piston member having a radially outwardly enlarged end portion closely fitted within the enclosure means and extending about the guide member permitting axial movement along the elongated guide member without significant fluid leakage thereabout whereby the tubular piston's enlarged end portion is exposed to the pressurized engine fluid;
   electrically conductive spring means extending between the closed end of the enclosure means and the enlarged end portion of the piston member normally urging the piston member in opposition to forces caused be pressurized fluid;
   an electrical contact means carried by the tubular piston member;
   a spirally-wound wire coil about the guide member, the contact and coil being slidably cooperative as the piston member is moved along the guide member to produce a variable resistance in a circuit including portions of the coil, the electrical contact means and the conductive spring;
   terminal means supported by the closed end portion of the enclosure, a first terminal being directly connected to one end of the spirally-wound wire coil, a second terminal being directly connected to the opposite end of the spirally-wound wire and to one end of the conductive spring means;

a second opposite end of the conductive spring means engaging the electrical contact carried by the piston member whereby resultant movement of the contact axially along the coil changes the resistance across the two terminals.

3. In combination with a vehicle engine, specifically an engine block having an oil passage for transmitting pressurized oil therethrough, a pressure transducer responsive to oil pressure to respond to oil pressure levels, comprising:

a transducer enclosure means defining an interior space and with an apertured end threaded for removable attachment to the engine block and with an opposite closed end;

the apertured end of the enclosure means being fluidly connected to the engine's pressurized fluid;

an elongated tubular guide supported by the closed end of the enclosure means and extending through the interior space and apertured end;

the guide having an axially extending passage therethrough communicated with the interior space of the enclosure means at a location adjacent the closed end;

the guide having a second end portion adapted to engage the engine structure in a manner for discharging fluid from the enclosure means only through the passage of the guide;

an elongated tubular piston member closely fitted within the enclosure means and extending about the guide to permit relative axial movements;

a yieldable spring means of electrically conductive material extending between the closed end of the enclosure means and the piston member urging it away from the closed end;

a spirally-wound wire resistance coil extending about the guide;

a pair of terminals carried by the closed end portion of the enclosure means, one terminal being connected to a first end of the wire coil and the other terminal being connected to the opposite second end of the coil, a terminal also connected to one end of the conductive spring means;

an electrical contact making means supported by and movable with the piston member whereby the contact making means engages the wire coil in axial sliding relation therewith;

the contact making means also being connected to a second end of the conductive spring means whereby when the piston member moves in response to the forces of fluid pressure, the contact making means slides axially across the wires of the resistance coil and progressively decreases resistance exhibited across the terminals.

* * * * *